(12) United States Patent
Matsumura (10) Patent No.: US 7,874,330 B2
(45) Date of Patent: Jan. 25, 2011

(54) MOTORCYCLE TIRE FOR OFF-ROAD TRAVELING

(75) Inventor: Sadahiko Matsumura, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 167 days.

(21) Appl. No.: 12/153,070

(22) Filed: May 13, 2008

(65) Prior Publication Data

US 2008/0283167 A1    Nov. 20, 2008

(30) Foreign Application Priority Data

May 14, 2007    (JP) .............................. 2007-128166

(51) Int. Cl.
*B60C 11/11* (2006.01)

(52) U.S. Cl. .......................... 152/209.11; 152/209.15; 152/209.24; 152/902

(58) Field of Classification Search ............ 152/209.11, 152/209.15, 209.24, 902; D12/536, 544, D12/571, 579
See application file for complete search history.

(56) References Cited

U.S. PATENT DOCUMENTS 5,377,734 A *   1/1995   Klein et al. ............ 152/209.11

FOREIGN PATENT DOCUMENTS

| EP | 1 923 236 A1 | 5/2008 |
|---|---|---|
| GB | 2 005 200 A | 4/1979 |
| GB | 2005200 | * 4/1979 |
| JP | 61 012411 | 1/1986 |
| JP | 61 092903 | 5/1986 |
| JP | 2-136306 A | 5/1990 |
| JP | 3-204305 A | 9/1991 |
| JP | 07-215016 | * 8/1995 |
| JP | 8 091024 | 4/1996 |
| JP | 11-078427 | * 3/1999 |
| JP | 11-78427 A | 3/1999 |
| JP | 2002 046424 | 2/2002 |
| JP | 2002-144820 | * 5/2002 |
| JP | 2002 144820 | 5/2002 |
| JP | 2003-146022 | * 5/2003 |
| JP | 2004-351956 A | 12/2004 |
| JP | 2005-199927 | * 7/2005 |
| JP | 2005-199927 A | 7/2005 |

OTHER PUBLICATIONS

Machine translation for Japan 2005-199927 (no date).*
Machine translation for Japan 2003-146022 (no date).*
Machine translation for Japan 2002-144820 (no date).*
Machine translation for Japan 11-078427 (no date).*
Machine translation for Japan 07-215016 (no date).*

* cited by examiner

*Primary Examiner*—Steven D Maki
(74) *Attorney, Agent, or Firm*—Birch, Stewart, Kolasch & Birch, LLP (57) ABSTRACT

An off-road motorcycle tire having a block pattern comprising a plurality of blocks 11 defined by tread grooves 10, each block 11 having a circumferential profile 16 of top surface 12 in the form of a straight line or a circular arc having a radius Ra of curvature of at least 500 mm, in which the circumferential profile denotes a profile in the circumferential section which passes through the centroid G of the top surface 12 and is parallel to the tire equatorial plane Cc. According to the invention, the ground contact pressure at the periphery of the top surface of blocks 11 is prevented from lowering to enhance the edge effect.

7 Claims, 7 Drawing Sheets

MOTORCYCLE TIRE FOR OFF-ROAD TRAVELING

BACKGROUND OF THE INVENTION

The present invention relates to a motorcycle tire suitable for off-road traveling, and more particularly to an off-road motorcycle tire having a steering stability improved by devising the circumferential profile shape of the surface of blocks provided in the tread surface.

Tires for traveling on unpaved roads or rough terrain, e.g., off-road racing motorcycle tires, are provided with a block type tread pattern in which a plurality of blocks defined by tread grooves are formed in a tread portion, in order to secure a good traction performance on rough terrain, as disclosed for example in JP-A-11-078427.

Figure 7A:
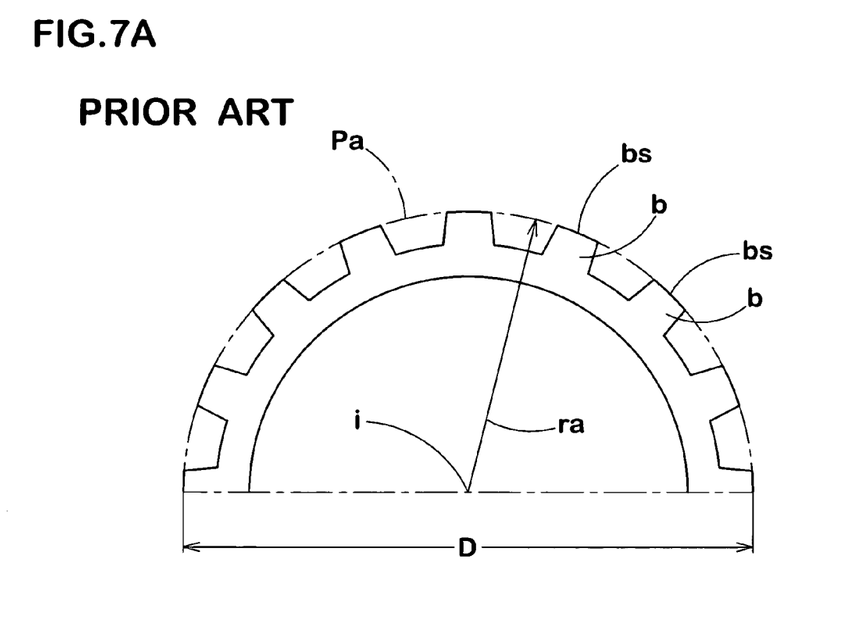
FIGS. 7A and 7B are circumferential and meridional section views is for showing the profile shape of the top surface of each block of a conventional tire.
Figure 7B:
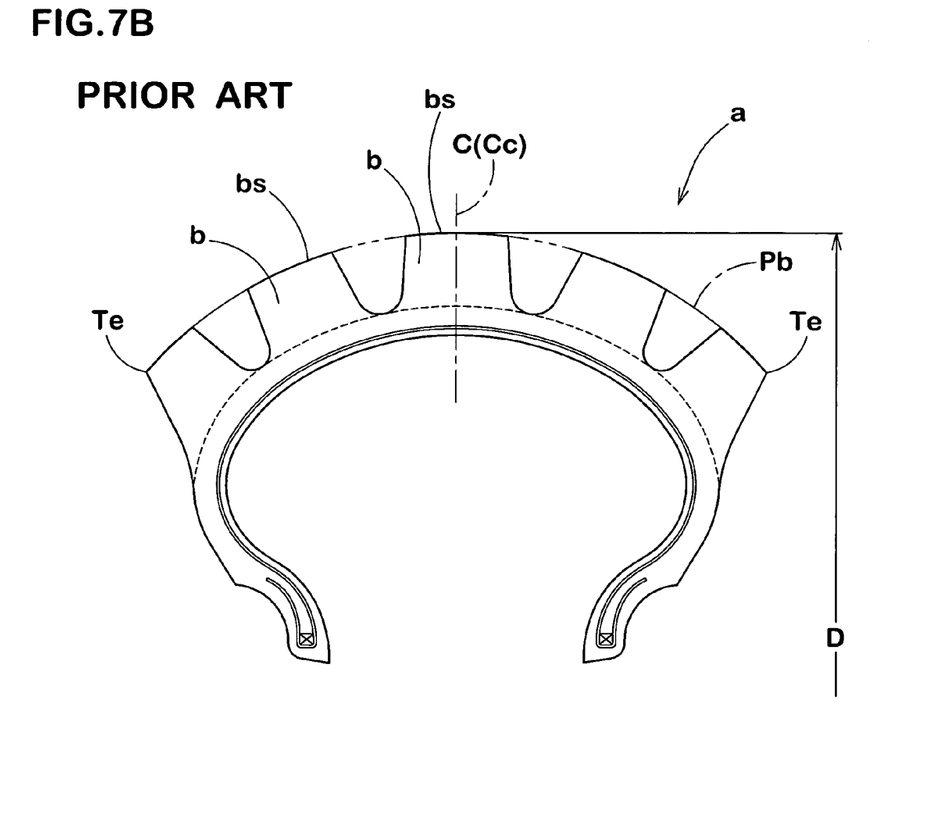

In general, as shown in FIGS. 7A and 7B, a tread portion "a" of these tires has a single circular arc tread profile Pa having a tire shaft center "i" as the center of arc in a circumferential section parallel to the tire equatorial plane Cc. Ground-contacting top surface "bs" of each of blocks "b" which constitute a block pattern is formed into a convex arc profile shape along the tread profile Pa in the circumferential section. The radius "ra" of curvature of the tread profile Pa in the circumferential section at the equatorial plane Cc is identical with half of the outer diameter D of the tire (ra=D/2). In the meridional cross section perpendicular to the tire equatorial plane Cc, the tread portion "a" has a smooth convex arc profile Pb connecting both tread edges Te, Te. The top surface "bs" of each of the blocks "b" is formed into a convex arc profile shape along the tread profile Pb in the meridional cross section.

However, the blocks "b" having a top surface "bs" of such a profile shape have a problem that the ground contact pressure at the periphery of the block top surface "bs" becomes low as compared with a central portion of the block top surface "bs", so the edge effect brought by block edges is not effectively exhibited and no satisfactory traction performance is obtained.

Accordingly, it is an object of the present invention to provide an off-road motorcycle tire having an improved traction performance.

This and other objects of the present invention will become apparent from the description hereinafter.

SUMMARY OF THE INVENTION

It has been found that when the blocks are formed so that the profile of the top surface of each block in the circumferential section is in the form of a straight line or a circular arc having a radius of curvature larger than half of the outer diameter of a tire, e.g., a radius Ra of curvature of at least 500 mm, decrease in ground contact pressure at the periphery of the top surface of each block can be suppressed to enhance the edge effect and accordingly the traction performance can be enhanced.

In accordance with the present invention, there is provided an off-road motorcycle tire having a block pattern comprising a plurality of blocks defined by tread grooves in a tread portion, wherein:

each of the blocks includes a top surface which comes into contact with a road, and wall surfaces extending from the periphery of the top surface to the bottoms of the tread grooves, and each block has a circumferential profile of the top surface in the form of a straight line or a circular arc having a radius Ra of curvature of at least 500 mm, in which the circumferential profile denotes a profile in the circumferential section which passes through the centroid of the top surface and is parallel to the tire equatorial plane.

In an embodiment of the present invention, the blocks include center blocks disposed on the tire equator and outer blocks disposed along both tread edges, wherein:

the center blocks have a meridional profile of the top surface in the form of a straight line or a circular arc having a radius Rbc of curvature of at least 500 mm, in which the meridional profile denotes a profile in the meridional section which passes through the centroid of the top surface and is perpendicular to the tire equatorial plane, and the outer blocks have a meridional profile of the top surface in the form of a circular arc having a radius Rbe of curvature smaller than the radius Rbc of curvature of the meridional profile of the center blocks.

It is preferable that among the block wall surfaces mentioned above, wall surfaces facing in the circumferential direction of tire comprise an upper wall portion located on the block top surface side, and a lower wall portion located on the groove bottom side, and the inclination angle $\theta1$ of the upper wall portion with respect to a normal line to the block top surface is smaller than the inclination angle $\theta2$ of the lower wall portion with respect to the normal line to the block top surface.

It is also preferable that among the block wall surfaces mentioned above, wall surfaces facing in the axial direction of tire comprise an upper wall portion located on the block top surface side, and a lower wall portion located on the groove bottom side, and the inclination angle $\alpha1$ of the upper wall portion with respect to a normal line to the block top surface is smaller than the inclination angle $\alpha2$ of the lower wall portion with respect to the normal line to the block top surface.

It is preferable that the blocks include center blocks disposed on the tire equator and outer blocks disposed along both tread edges, and the inclination angle $\alpha1$ of an axially facing block wall for the outer blocks is smaller than the inclination angle $\alpha1$ for the center blocks. It is further preferable that the inclination angle $\alpha2$ of an axially facing block wall for the outer blocks is larger than the inclination angle $\alpha2$ for the center blocks.

A part or all of the blocks may have a recess portion in a center portion of the top surface of each block.

The term "circumferential profile" of top surface as used herein denotes a profile of the top surface of each block in the circumferential section which passes through the centroid of the block top surface and is parallel to the tire equatorial plane. Also, the term "meridional profile" of top surface as used herein denotes a profile of the top surface of each block in the meridional section which passes through the centroid of the block top surface and is perpendicular to the tire equatorial plane.

In the specification, the "dimensions" and so on of respective parts or portions of a tire denotes values measured under a normal inner pressure condition, namely those measured with respect to the tire mounted on a normal rim and inflated to a normal inner pressure under no loading, unless otherwise noted. The term "normal rim" denotes a rim defined for every tire in a standardizing system on which the tire is based and is, for example, the "standard rim" in JATMA, the "Design Rim" in TRA and the "Measuring Rim" in ETRTO. The term "normal inner pressure" denotes an air pressure defined for every tire in the standardizing system and is, for example, the "maximum air pressure" in JATMA, the maximum value recited in the table of "Tire Load Limits at Various Cold Inflation Pressures" in TRA, and the "Inflation Pressure" in ETRTO.

Since in the present invention the blocks are formed to have a block surface such that the circumferential profile of the top surface of each block is rectilinear or in the form of a circular arc having a radius of curvature larger than half of the outer diameter of a tire, e.g., a radius of curvature of 500 mm or more, decrease in ground contact pressure at the periphery of the top surface of each block can be suppressed to enhance the edge effect and accordingly the traction performance can be enhanced.

DETAILED DESCRIPTION OF THE INVENTION

Figure 1:
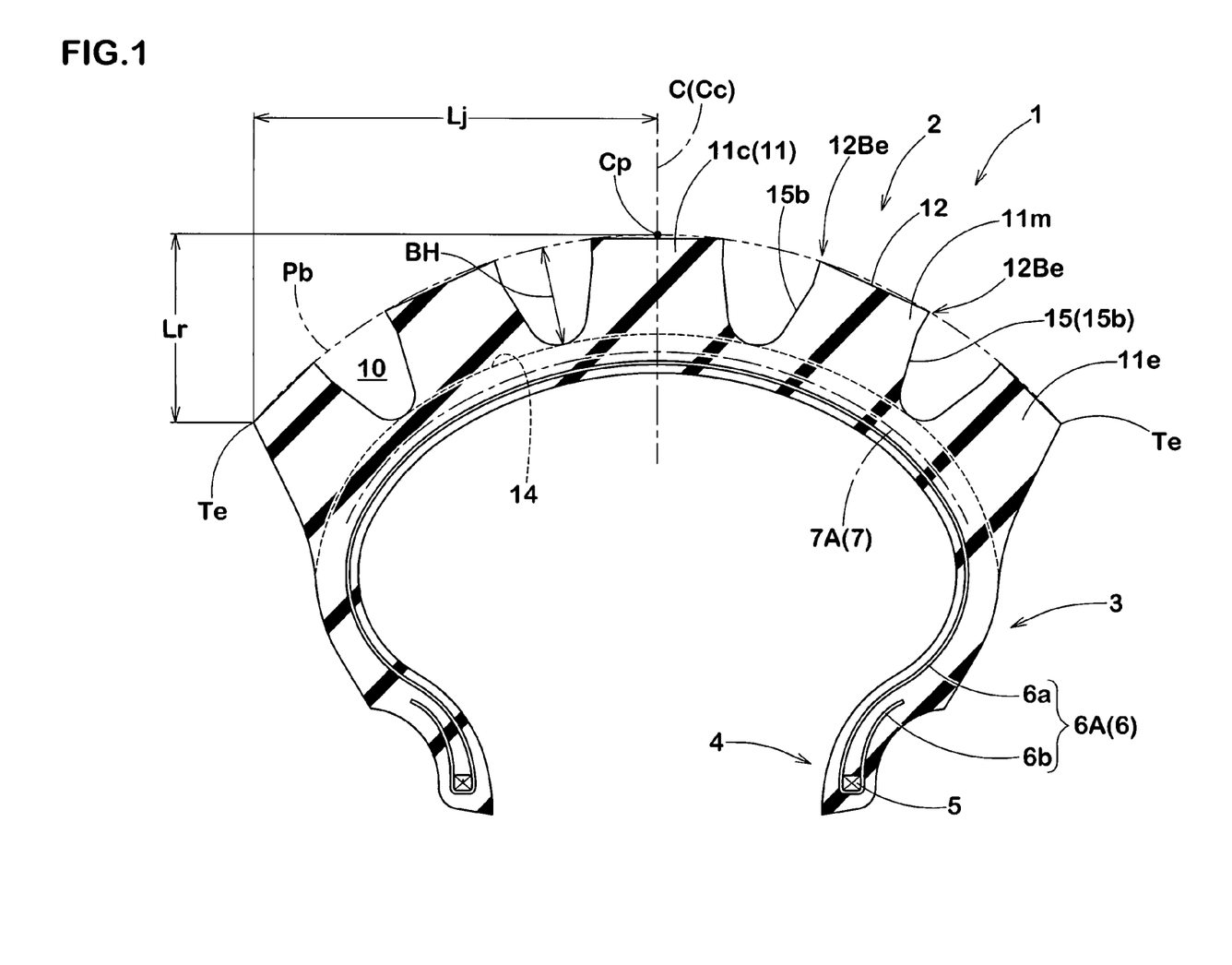
FIG. 1 is a cross sectional view of an off-road motorcycle tire illustrating an embodiment of the present invention.
Figure 2:
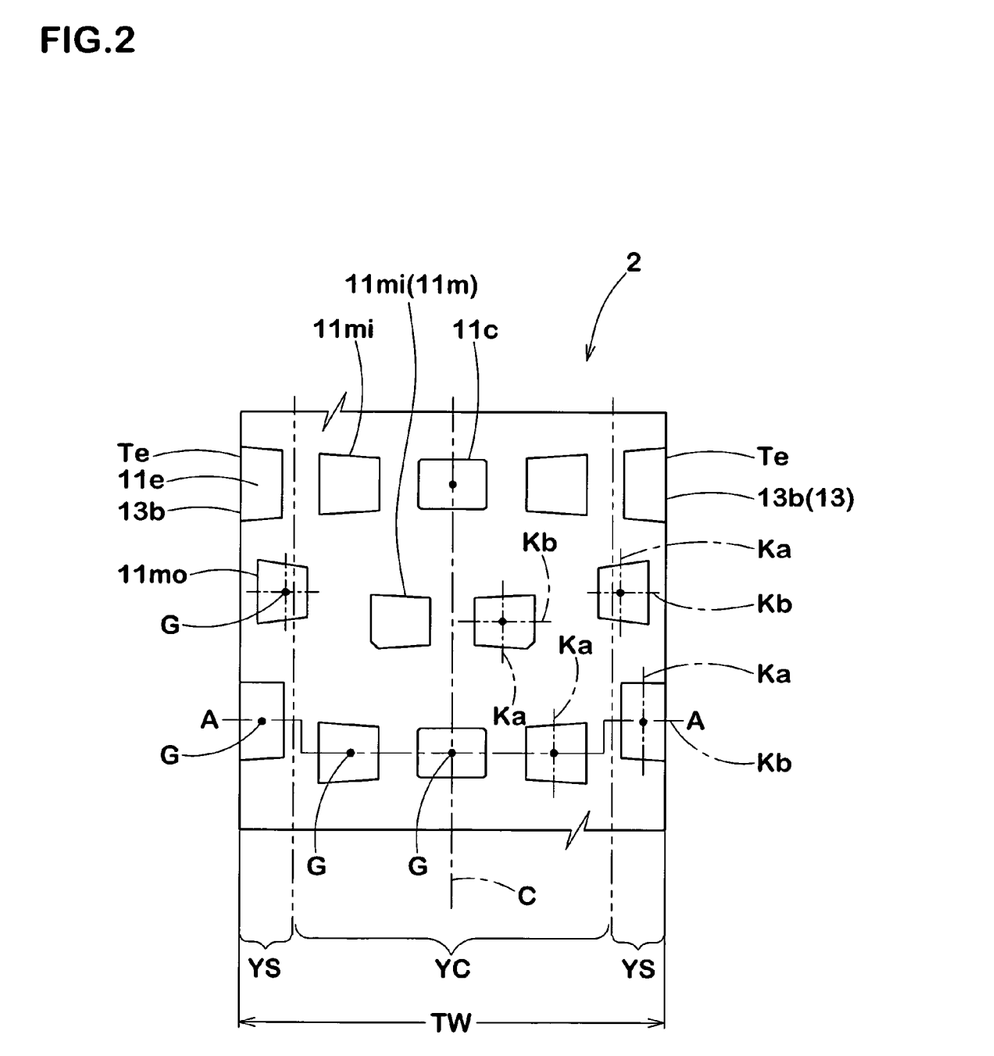
FIG. 2 is a development showing a tread pattern of the motorcycle tire of FIG. 1.

An embodiment of the present invention will now be explained with reference to the accompanying drawings. FIG. 1 is a meridional section view of an off-road motorcycle tire under the normal inner pressure condition according to an embodiment of the present invention, and FIG. 2 is a development showing a tread pattern of the tire shown in FIG. 1. FIG. 1 corresponds to a sectional view taken on line A-A in FIG. 2.

As shown in FIG. 1, off-road motorcycle tire 1 in this embodiment includes a tread portion 2, a pair of sidewall portions 3,3 extending radially inwardly from the both edges of the tread portion 2, and a pair of bead portions 4,4 which are located at radially inner edges of the sidewall portions 4,4 and to which a rim (not shown) is attached. The tire 1 shown in this embodiment is a motorcycle tire suitable for motocross racing.

In tread portion 2 is formed a tread pattern (shown in FIG. 2) comprising a large number of blocks 11 defined by tread grooves 10. Each of the blocks 11 has a top surface 12 which comes into contact with a road, and wall surfaces 15 extending from the peripheral edges 13 of the top surface 12 to the bottoms 14 of the tread grooves 10. From the viewpoints of driving performance and braking performance, an approximately quadrangular shape is preferred for the top surface 12.

In a meridional section perpendicular to the tire equatorial plane Cc and including a tire rotation shaft, the tread portion 2 has a smooth curved tread profile Pb extending in a convex circular arc shape from the tire equator C toward both tread edges Te. This tread profile Pb in the meridional direction (i.e., axial direction of tire) is defined as a profile line smoothly connecting axial edges 12Be of top surfaces 12 of respective blocks in the meridional section. In this embodiment shown in the drawings, the tread profile Pb has a circular arc shape such that radial distance Lr from an equatorial point Cp (a point of the arc on the tire equator C) to the tread edge Te is from 30 to 40 mm, and the camber which is defined by Lr/Lj ratio is from 0.35 to 0.75 in which Lj is an axial distance from the equatorial point Cp (tire equator C) to the tread edge Te. Since the tire 1 has such a tread profile, banking at a large angle is possible at the time of cornering. The tread edges Te are located axially outward of the sidewalls 3 to hang over them.

The tire 1 is reinforced by a toroidal carcass 6 and a tread-reinforcing layer 7 which is disposed radially outward of the carcass 6 and radially inward of the tread portion 2.

The carcass 6 comprises at least one carcass ply 6A which comprises a main portion 6a toroidally extending between a pair of bead cores 5,5 disposed in opposing bead portions 4,4, and turnup portions 6b that extend from the both ends of the main body portion 6a and are turned up around the bead cores 5 from the axially inside to the axially outside of the tire to thereby anchor the carcass ply. As a carcass 6 is preferred, from the viewpoint of tire lateral rigidity, one having a bias structure comprising at least two carcass plies of organic fiber cords which are arranged at an angle of, for example, 15 to 45° with respect to the circumferential direction of tire. Of course, however, there can be used, as occasion demands, a carcass having a radial structure comprising at least one carcass ply of the carcass cords which are arranged at an angle of, for example, 75 to 90° with respect to the circumferential direction of tire.

The tread-reinforcing layer 7 comprises at least one reinforcement ply 7A (in this embodiment, two plies 7A) of organic fiber cords arranged at an angle of, for example, 15 to 45° with respect to the circumferential direction of tire. The tread-reinforcing layer 7 is disposed to reinforce the tread portion 2 over an approximately overall width of the tread portion 2, thereby securing a required tread rigidity.

As to a block pattern provided in the tread portion 2, the blocks 11 are relatively sparsely provided, whereby the blocks deeply dig into a soft terrain such as mud to exhibit a high driving force. A sparsely distributed block disposition is also useful for preventing clogging of grooves with mud, since tread grooves 10 between the blocks 11 become wide. The sparsely distributed disposition of blocks 11 can be quantitatively defined by a land ratio Sb/S of the total surface area Sb of top surfaces 12 of all blocks 11 to the whole surface area S of the outer surface of the tread portion 2 (i.e., surface area of an imaginary tread in which all tread grooves 10 are filled up). If the land ratio is too small, the driving force on a hard road or a medium road is decreased, and if the land ratio is too large, the driving force on a soft road such as mud is decreased. From such points of view, the land ratio Sb/S is preferably from 10 to 30%.

If the height BH (shown in FIG. 1) of block 11 is too small, there is a tendency that sufficient driving or braking force is not obtained on unpaved road or rough terrain, and if the height BH is too large, a large bending moment acts on the root of the block 11 at the time of driving or braking, so the durability of the block 11 tends to deteriorate. From such points of view, it is preferable that the height BH of the blocks 11 is from 7 to 19 mm. Herein, the block height BH is defined as a height of tread groove 10 from the groove bottom 14 at the axial edge 12Be of the block top surface 12, or as a height of tread groove 10 from the groove bottom 14 at the tread profile Pb in the meridional direction.

As shown in FIG. 2, the blocks 11 include, at least, center blocks 11c disposed on the tire equator C and outer blocks 11e disposed along both tread edges Te. In this embodiment, the center blocks 11c have centroids G of their top surfaces 12 on the tire equator C. However, the term "center block" 11c encompasses all blocks having a top surface 12 at least a part of which is located on the tire equator C. The outer blocks 11e are blocks disposed along the tread edges Te, and denote blocks that an axially outer edge 13b of peripheral edges 13 of the block top surface 12 constitutes the tread edge 11e. Middle blocks 11m may be further disposed between the center blocks 11c and the outer blocks 11e, in other words, between the tire equator C and each tread edge Te. Of middle blocks 11m, blocks having a centroid G of their top surface 12 in shoulder regions YS,YS having a width of 12.5% of a tread-developed width TW from the tread edge Te are defined as middle outer blocks 11mo, and blocks having a centroid G of their top surface 12 in a crown region YC located between the shoulder regions YS,YS are defined as middle inner blocks 11mi.

Figure 3A:
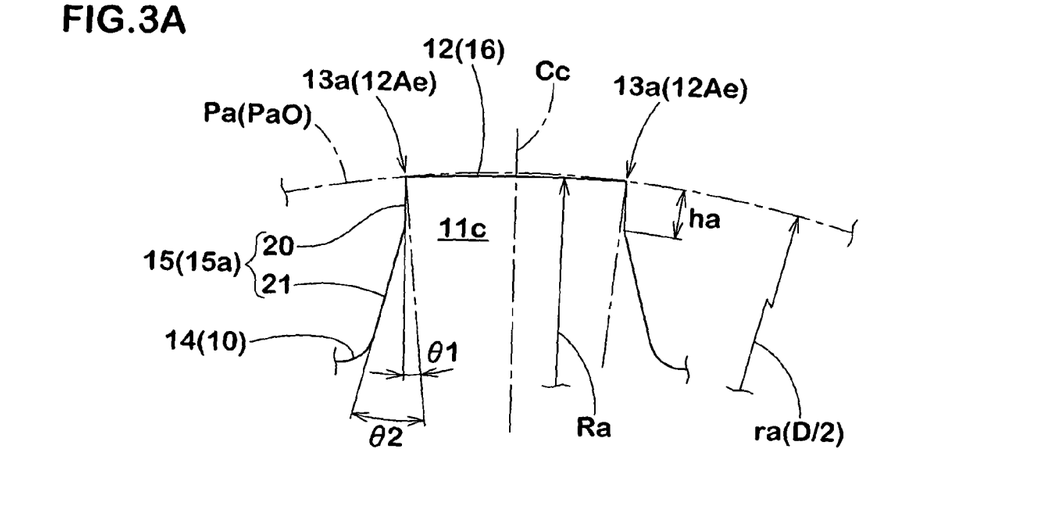
FIGS. 3A, 3B and 3C are a circumferential cross section view of a block for showing a profile shape of the top surface of the block in the circumferential direction.
Figure 3B:
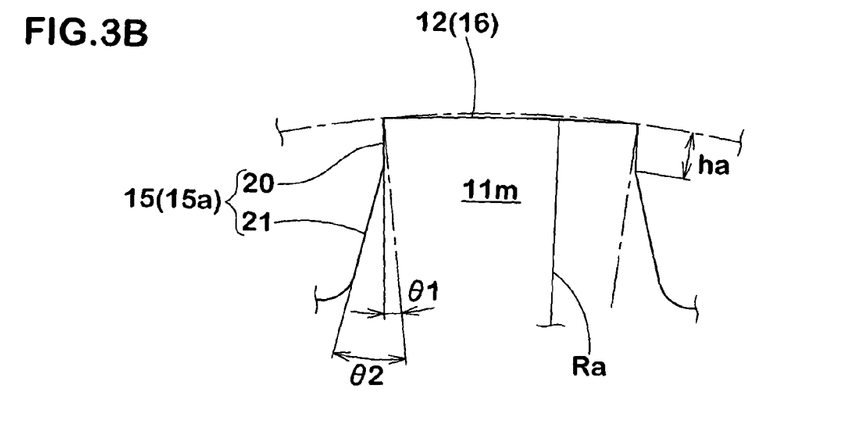
Figure 3C:
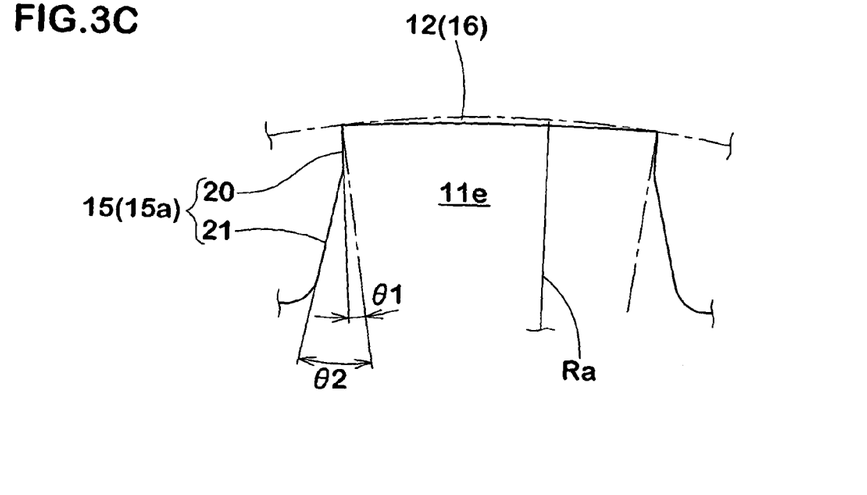

In the tire 1 according to this embodiment, as shown in FIGS. 3A to 3C in an enlarged manner, the circumferential profile 16 of the top surface 12 of each of the blocks 11c, 11m and 11e in the circumferential section Ka which passes through the centroid G of the top surface 12 and is parallel to the tire equatorial plane Cc is rectilinear or in the form of a circular arc having a radius Ra of curvature of at least 500 mm. In the drawings, the mark "Pa" denotes a tread profile in the form of a single arc which has a tire shaft center as the center of curvature in the circumferential section Ka of each block and which passes through circumferentially outer edges 12Ae of the top surface 12. In particular, tread profile PaO on the tire equatorial plane Cc has a radius "ra" of curvature identical to halt of the tire diameter D (D/2).

In the present invention, the blocks 11c, 11m and 11e are formed to have the top surface 12 with a circumferential profile 16 in the form of a straight line or a circular arc having a larger radius of curvature than the radius "ra" of curvature of the tread profile PaO, e.g., a radius of curvature of at least 500 mm, in each circumferential section Ka.

Since the blocks have such a circumferential section profile, a center portion of the top surface 12 of each block dents radially inwardly from the tread profile Pa, so the ground contact pressure at the circumferentially outer edge points 12Ae of the top surface 12 can be enhanced relatively. Therefore, the edge effect at the circumferentially outer edge points 12Ae, namely the edge effect of circumferential edges 13a of the top surface 12, can be enhanced to improve the traction performance.

The circumferential profile 16 may be in the form of any of a convex circular arc having a curvature center inside the tire, a concave circular arc having a curvature center outside the tire and a straight line. The shape of the circumferential profile 16 (convex circular arc profile, concave circular arc profile and rectilinear profile) and the radius Ra of curvature can be set for each of blocks 11c, 11m and 11e. However, from the viewpoints of steering stability and uneven wear, it is preferable to form the circumferential profile of all blocks 11c, 11m and 11e to have the same shape and the same radius of curvature.

Figure 4A:
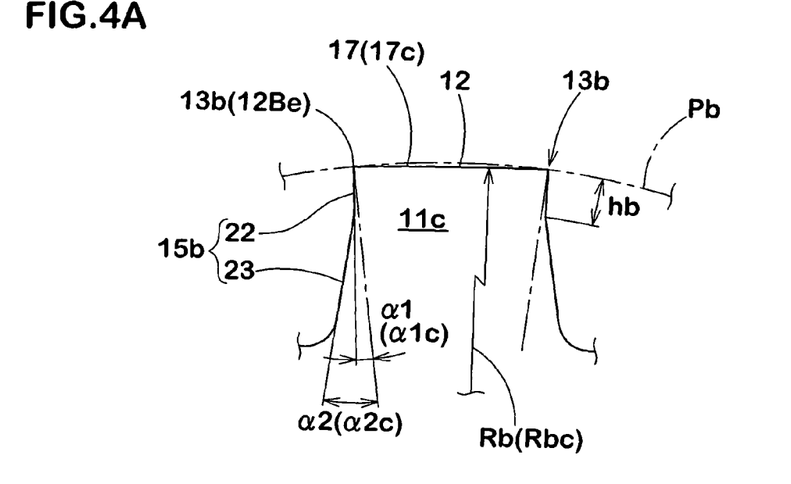
FIGS. 4A, 4B and 4C are a meridional cross section view of a block for showing a profile shape of the top surface of the block in the meridional direction.
Figure 4B:
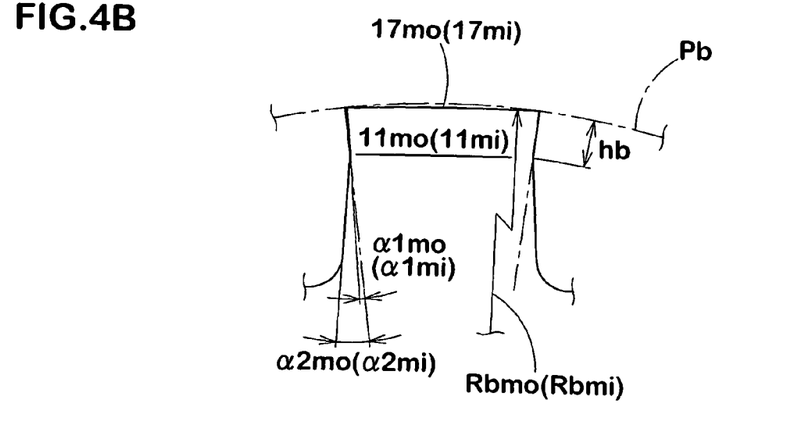
Figure 4C:
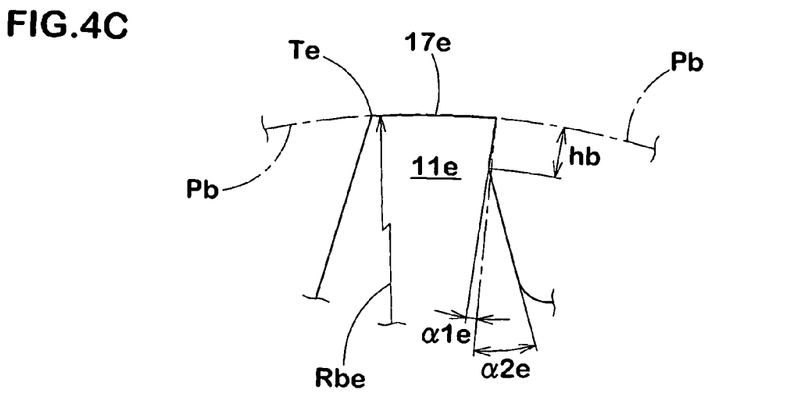

As shown in FIGS. 4A, 4B and 4C in an enlarged manner, the meridional profile 17 of the top surface 12 of each of the blocks 11c, 11m and 11e in the meridian section Kb which passes through the centroid G of the top surface 12 and is perpendicular to the tire equatorial plane Cc is rectilinear or in the form of a circular arc having a radius Rb of curvature.

Of these, the center blocks 11c are formed to have a meridional section profile 17c in the form of a straight line or a circular arc having a radius Rbc of curvature of at least 500 mm. On the other hand, the outer blocks 11e are formed to have a meridional section profile 17e in the form of a circular arc having a radius Rbe of curvature smaller than the radius Rbc of curvature of the meridional profile 17c of the center blocks 11c. As to the middle blocks 11m, the middle outer blocks 11mo are formed to have a meridional section profile 17mo in the form of a circular arc having a radius Rbmo of curvature smaller than the radius Rbc of curvature of the meridional profile 17c of the center blocks 11c. The middle inner blocks 11mi are formed to have a meridional section profile 17mi in the form of a straight line or a circular arc having a radius Rbmi of curvature of at least 500 mm. At least radii Rbc and Rbmi are larger than the radius "rb" of curvature of the meridional section tread profile Pb.

The edge effect at the axial edges 13b of the top surface 12 can be enhanced by forming the meridian cross section profile of the blocks in such a manner, so the side slip is suppressed to improve the cornering performance. It is preferable that the radius Rbe of curvature of the outer blocks 11e and the radius Rbmo of curvature of the middle outer blocks 11mo are from 30 to 100 mm, respectively. If these radii of curvature are less than 30 mm, a ground-contacting feel tends to be impaired, and if they are more than 100 mm, smoothness in banking of motorcycle during cornering is impaired and the cornering performance tends to be deteriorated. The radii Rbe and Rbmo of curvature are more preferably from 30 to 70 mm for tires having a width of less than 110 mm, and from 50 to 100 mm for tires having a width of 110 mm or more.

In case of forming the meridional cross section profile 17 into a circular arc shape, it is formed into a convex circular arc having a curvature center inside the tire, from the viewpoint of cornering performance.

As shown in FIGS. 3A to 3C, among the wall surfaces 15 of blocks 11c, 11m and 11e in this embodiment, each of wall surfaces 15a facing in the circumferential direction of tire is composed of an upper wall portion 20 located on the block top surface 12 side, and a lower wall portion 21 located on the groove bottom 14 side.

The inclination angle $\theta 1$ of the upper wall portion 20 with respect to a normal line to the block top surface 12 is made smaller than the inclination angle $\theta 2$ of the lower wall portion 21 with respect to the normal line to the block top surface 12. The reason is that the circumferentially outer edges 13a are sharpened by forming the upper wall portion 20 at a steep angle, whereby the edge effect can be further enhanced. Further, since the upper wall portion 20 is steep, the blocks 11 can deeply dig into mud or the like. Thus, the grip performance can be further enhanced on both a hard terrain and a soft terrain such as mud or sand. Also, since the inclination angle $\theta 2$ of the lower wall portion 21 is made larger than the inclination angle $\theta 1$ of the upper wall portion 20, a root portion of block 11 is reinforced and accordingly the block rigidity can be maintained.

Specifically, as to the blocks 11c, 11m and 11e, it is preferable that the inclination angle $\theta 1$ of the upper wall portion 20 is from 0 to 10°, and the inclination angle $\theta 2$ of the lower wall portion 21 is from 7 to 25°. Further, it is preferable that the difference $\theta 2 - \theta 1$ between the inclination angles $\theta 1$ and $\theta 2$ is 5° or more. If the inclination angle $\theta 1$ is more than 10°, further improvement in edge effect brought by steep wall is not obtained, and if the inclination angle $\theta 1$ is less than 0°, the edges 13a become too sharp, so chipping of edges is easy to occur. Also, if the inclination angle $\theta 2$ is less than 7°, reinforcement of blocks is not sufficient, and if the inclination angle $\theta 2$ is more than 25°, the digging property of the blocks into mud is impaired.

The height "ha" of the upper wall portion 20 is preferably from 0.05 to 0.5 times the block height BH. If the height "ha" is less than 0.05 times, the effect of improving the grip performance based on the upper wall portion 20 is not exhibited, and if the height "ha" is more than 0.5 times, the reinforcement effect based on the lower wall portion 21 is not exhibited.

As shown in FIGS. 4A to 4C, among the wall surfaces 15 of blocks 11c, 11m and 11e in this embodiment, each of wall surfaces 15b facing in the axial direction of tire is composed of an upper wall portion 22 located on the block top surface 12 side, and a lower wall portion 23 located on the groove bottom 14 side, in the same manner as the block walls 15a circumferentially opposing each other. The inclination angle α1 of the upper wall portion 22 with respect to the normal line to the block top surface 12 is smaller than the inclination angle α2 of the lower wall portion 23 with respect to the normal line to the block top surface 12. Further, it is preferable that the difference α2-α1 is 5° or more. The height "hb" of the upper wall portion 22 is preferably from 0.05 to 0.5 times the block height BH. Such axially facing block walls 15b are effective for enhancing the lateral grip performance to thereby further improve the cornering performance.

It is preferable that the inclination angle α1 (α1e) of the axially facing block wall 15b for the outer blocks 11e is smaller than the inclination angle α1 (α1c) for the center blocks 11c, whereby the lateral grip performance can be more effectively improved. In that case, however, the outer blocks 11e tend to lack the lateral rigidity. Therefore, for the purpose of maintaining the lateral rigidity of the outer blocks 11e, preferably the inclination angle α2 (α2e) for the outer blocks 11e is made larger than the inclination angle α2 (α2c) for the center blocks 11c.

Specifically, as to the center blocks 11c, it is preferable that the inclination angle α1c is from 0 to 10°, and the inclination angle α2c is from 7 to 25°. Further, as to the outer blocks 11e, it is preferable that the inclination angle α1e of the upper wall portion 22 is from −5 to −3°, and the inclination angle α2e of the lower wall portion 23 is from 15 to 25°. The mark "−" as used herein for the inclination angle α denotes that the block wall 15 is inclined in a direction that the block width increases toward the block top surface 12.

As to the middle blocks 11m, it is preferable that the inclination angle α1m is identical to or less than the inclination angle α1c, and the inclination angle α2m is identical to or more than the inclination angle α2e and is identical to or less than the inclination angle α2c. In particular, it is preferable that the middle inner blocks 11mi have an inclination angle α1mi of −3 to 0° and an inclination angle α2mi of 7 to 15°. Further, it is preferable that the middle outer blocks 11mo have an inclination angle α1mo of −5 to −3°, and the inclination angle α2c is from 7 to 25° is from 0 to 10° and an inclination angle α2mo of 15 to 25°.

Figure 5:
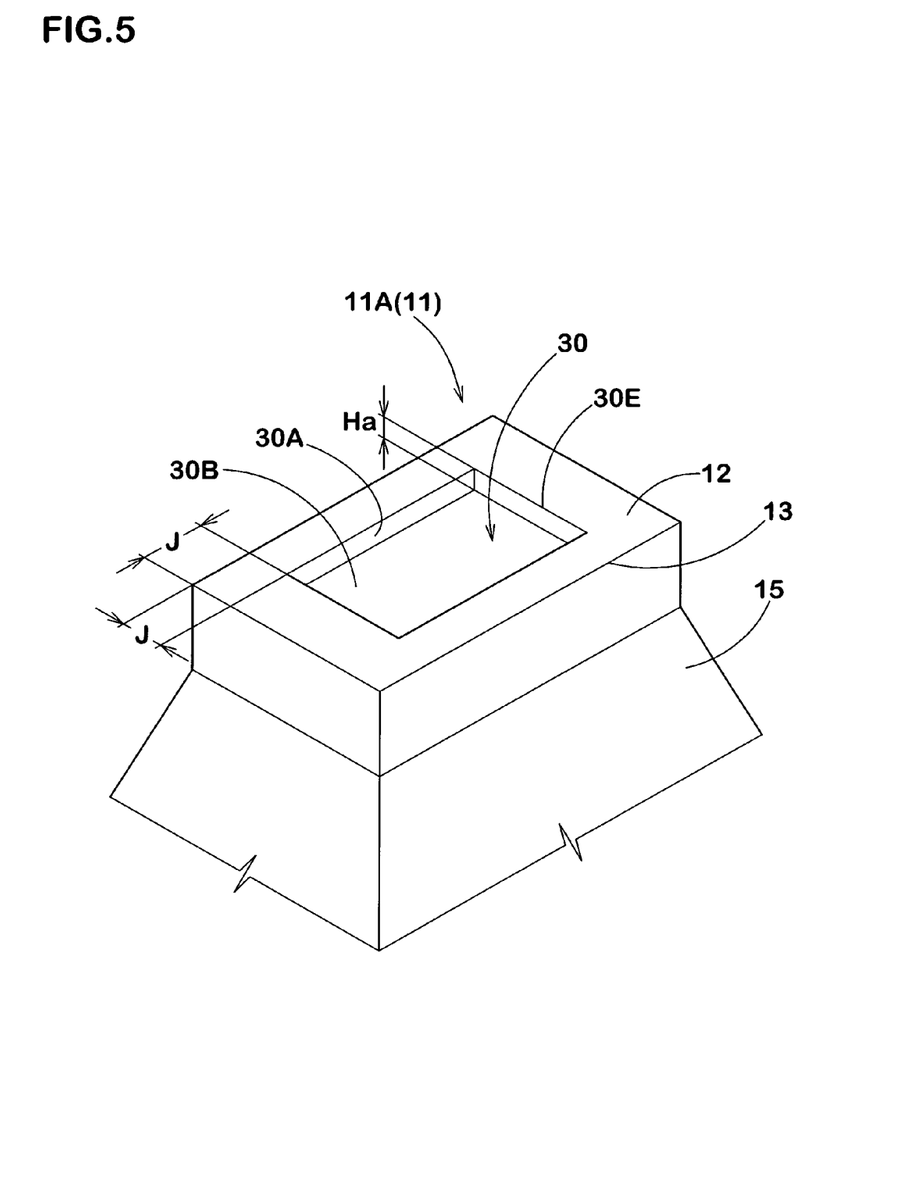
FIG. 5 is a perspective view illustrating a recessed block.

The blocks 11 may include recessed blocks 11A as shown in FIG. 5, wherein a recess portion 30 is formed in a center portion of the top surface 12 of each block. In the present embodiment, all blocks 11 formed in the tread portion are the recessed blocks 11A, but of course a part of the blocks 11 may be the recessed blocks 11A. For example, only the center blocks 11c, or only the middle blocks 11m, or only the outer blocks 11e, are replaced with the recessed blocks 11A. Combination of non-recessed blocks 11 and recessed blocks 11A can be suitably set.

The recess portion 30 is a recess surrounded by edge lines 30E parallel to the peripheral edges 13 of the block top surface 12. The recess portion 30 is effective for improving the grip performance, since mud or the like gets into the recess. The space J between a ridge line 30E and a peripheral edge 13 is from 3 to 10 mm, preferably 5 to 7 mm. If the space J is less than 3 mm, the rigidity at the peripheral edges 13 is impaired to lower the edge effect. If the space J is more than 10 mm, the recess portion 30 becomes small and the effect to be brought by formation of the recess portion can not be expected.

In the recess portion 30 shown in this embodiment, step faces 30A (walls of recess portion 30) extend from the ridge lines 30E to bottom 30B. The height Ha of the step faces 30A is from 1 to 3 mm, preferably 1.5 to 2.0 mm. If the height Ha is less than 1 mm, mud does not sufficiently get into the recess, and if it is more than 3 mm, the block rigidity is lowered and the edge effect tends to lower.

Figure 6A:
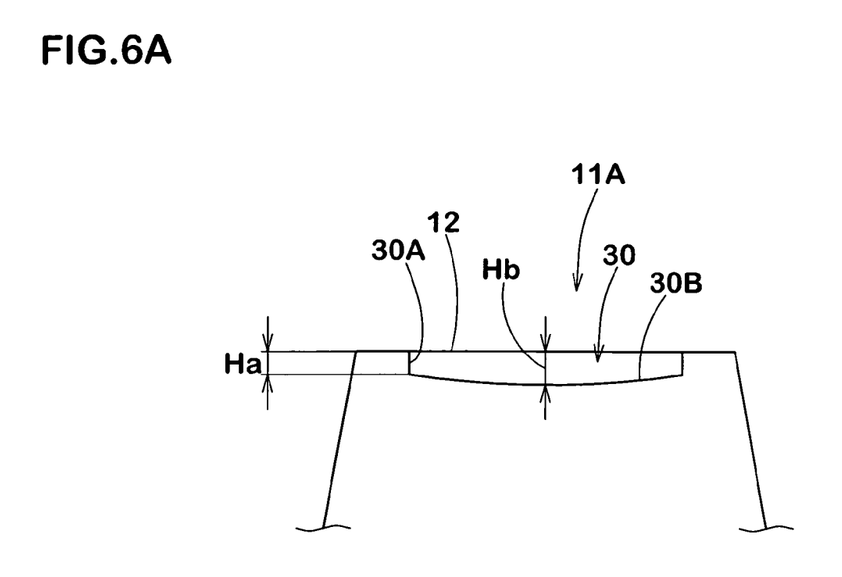
FIGS. 6A and 6B are a cross sectional view of a recessed block for illustrating the bottom of a recess portion.
Figure 6B:
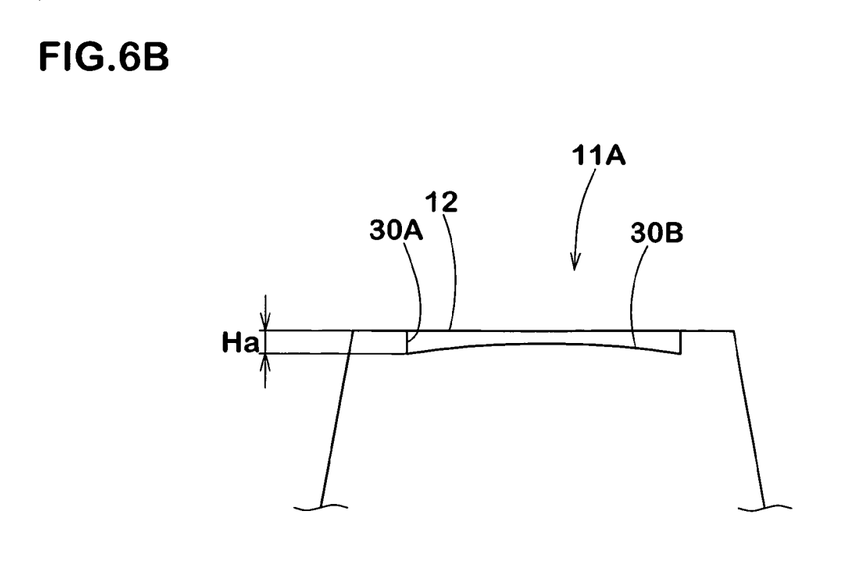

As shown in FIGS. 6A and 6B, the cross section profile of the bottom 30B of the recess portion 30 may be, besides flat surface, convex circular arc surface (FIG. 6B) and concave circular arc surface (FIG. 6A). In case of a convex circular arc bottom, it is required that a peak portion thereof does not protrude radially outward of the block top surface 12. In case of a concave circular arc bottom, it is preferable from the viewpoint of maintaining the block rigidity that the depth Hb from the top surface 12 of a deepest portion of the recess is at most 5 mm.

The blocks 11 according to this embodiment have a tendency that the block edges tend to be easily worn away since the edge effect is enhanced. Therefore, it is preferable to use, as a rubber for constituting the blocks 11, a rubber harder than conventionally used rubbers, e.g., a rubber having a Durometer Type A hardness of 75 to 80. Conventionally used rubbers usually have a Durometer Type A hardness of 70 to 74.

While a preferable embodiment of the present invention has been described with reference to the drawings, it goes without saying that the present invention is not limited to only such an embodiment and various changes and modifications may be made.

The present invention is more specifically described and explained by means of the following examples. It is to be understood that the present invention is not limited to these examples.

EXAMPLES

Off-road tires for motorcycle (size: 120/80-19 63M) having a tire structure shown in FIG. 1 and having a tread patter shown in FIG. 2 as a basic patter were manufactured based on the specifications shown in, Table 1. Other specifications of the tires are substantially common to all tires. The performances of the tires such as traction performance, grip performance and ground-contacting feel were evaluated by an actual running test.

<Actual Running Test>

A test tire was attached to the rear wheel of a 450 cc motocross motorcycle under the conditions of rim 19×2.15 and internal pressure 80 kPa, and was run on a motocross test course by a professional test driver. The traction performance, grip performance and ground-contacting feeling were evaluated by driver's feeling. The results are shown by an index to the result of Comparative Example 1 regarded as 100. The larger the value, the better the performances. In all tests, same tire (size 90/100-21 57M, rim 21×1.60, internal pressure 80 kPa) was used as a front wheel tire.

The results are shown in Table 1.

TABLE 1

| | Com. Ex. 1 | Com. Ex. 2 | Com. Ex. 3 | Ex. 1 | Ex. 2 | Ex. 3 | Ex. 4 | Ex. 5 | Ex. 6 | Ex. 7 |
|---|---|---|---|---|---|---|---|---|---|---|
| Circumferential section profile | arc | arc | arc | arc | arc | flat | flat | flat | flat | flat |
| Radius of curvature Ra (mm) | 340 | 340 | 340 | 500 | 500 | ∞ | ∞ | ∞ | ∞ | ∞ |
| Meridional section profile | arc | arc | arc | arc | arc | flat | flat | flat | flat | flat |
| Radius of curvature Rbc (mm) | 70 | 80 | 340 | 300 | 500 | ∞ | ∞ | ∞ | ∞ | ∞ |
| Radius of curvature Rbmi (mm) | 70 | 80 | 340 | 300 | 500 | ∞ | ∞ | ∞ | ∞ | ∞ |
| Radius of curvature Rbmo (mm) | 70 | 80 | 340 | 300 | 500 | ∞ | ∞ | ∞ | ∞ | ∞ |
| Radius of curvature Rbe (mm) | 70 | 80 | 340 | 300 | 500 | ∞ | ∞ | ∞ | ∞ | ∞ |
| Circumferentially facing block walls | | | | | | | | | | |
| Angle θ1 of upper wall portion | 5° | 5° | 5° | 5° | 5° | 5° | 5° | 5° | 10° | 5° |
| Angle θ2 of lower wall portion | 15° | 15° | 15° | 15° | 15° | 15° | 15° | 15° | 20° | 15° |
| Axially facing block walls Angle of upper wall portion | | | | | | | | | | |
| α1c | 10° | 10° | 10° | 10° | 10° | 10° | 10° | 5° | 5° | 10° |
| α1mo | −3° | −3° | −3° | −3° | −3° | −3° | −3° | −3° | −3° | −3° |
| α1mi | 0° | 0° | 0° | 0° | 0° | 0° | 0° | 0° | 0° | 0° |
| α1e | −3° | −3° | −3° | −3° | −3° | −3° | −3° | −3° | −3° | −5° |
| Angle of lower wall portion | | | | | | | | | | |
| α2c | 15° | 15° | 15° | 15° | 15° | 15° | 15° | 10° | 10° | 15° |
| α2mo | 20° | 20° | 20° | 20° | 20° | 20° | 20° | 20° | 20° | 20° |
| α2mi | 15° | 15° | 15° | 15° | 15° | 15° | 15° | 15° | 15° | 15° |
| α2e | 15° | 15° | 15° | 15° | 15° | 15° | 15° | 15° | 15° | 5° |
| Presence of recess portion | yes | yes | yes | yes | yes | yes | yes | yes | yes | yes |
| Space J (mm) | 6 | 6 | 6 | 6 | 6 | 6 | 10 | 6 | 6 | 6 |
| Height Ha (mm) | 2 | 2 | 2 | 2 | 2 | 2 | 2 | 2 | 2 | 2 |
| Traction performance | 100 | 105 | 105 | 120 | 130 | 140 | 140 | 130 | 150 | 140 |
| Grip performance | 100 | 105 | 110 | 110 | 130 | 140 | 120 | 140 | 130 | 110 |
| Ground-contacting feel | 100 | 105 | 110 | 110 | 120 | 125 | 120 | 120 | 120 | 110 |

What is claimed is:

1. A motorcycle tire for uneven terrain having a block pattern comprising a plurality of blocks defined by tread grooves in a tread portion, wherein:

each of said blocks includes a block tread surface which comes into contact with a road surface, and block wall surfaces extending from the periphery of this block tread surface to the bottoms of said tread grooves;

each of said blocks has a circumferential profile shape of said block tread surface in the form of a straight line or a circular arc having a radius Ra of curvature of not less than 500 mm, in which the circumferential profile shape denotes a profile shape in the circumferential cross section which passes through the centroid of the block tread surface and is parallel to the tire equatorial plane;

among said block wall surfaces in said blocks, block wall surfaces extending in the circumferential direction and facing in the axial direction of tire comprise an upper wall surface portion located on the block tread surface side and a lower wall surface portion located on the groove bottom side, and the inclination angle α1 of said upper wall surface portion with respect to a normal line to the block tread surface is smaller than the inclination angle α2 of said lower wall surface portion with respect to the normal line to the block tread surface; and said blocks include center blocks disposed on the tire equator and outer blocks disposed on the side closest to a tread edge, and in said outer block, said inclination angle α1 on the circumferentially extending block wall surface thereof is smaller than the inclination angle α1 on the circumferentially extending block wall surface of said center block, wherein said center blocks have a meridional profile shape of said block tread surface in the form of a straight line or a circular arc having a radius Rbc of curvature of not less than 500 mm, in which the meridional profile shape denotes a profile shape in the meridional cross section which passes through the centroid of the block tread surface and is perpendicular to the tire equatorial plane, and said outer blocks have a meridional profile shape of the block tread surface in the form of a circular arc having a radius Rbe of curvature smaller than the radius Rbc of curvature of said meridional profile shape of the center blocks, in which the meridional profile shape denotes a profile shape in the meridional cross section which passes through the centroid of the block tread surface and is perpendicular to the tire equatorial plane.

2. The motorcycle tire for uneven terrain according to claim 1, wherein among said block wall surfaces, block wall surfaces extending in the axial direction and facing in the circumferential direction of tire comprise an upper wall surface portion located on the block tread surface side and a lower wall surface portion located on the groove bottom side, and the inclination angle θ1 of said upper wall surface portion with respect to a normal line to the block tread surface is smaller than the inclination angle θ2 of said lower wall surface portion with respect to the normal line to the block tread surface.

3. The motorcycle tire for uneven terrain according to claim 2, wherein in said outer block, said inclination angle α2 of the circumferentially extending block wall surface is larger than the inclination angle α2 of the circumferentially extending block wall surface of the center block.

4. The motorcycle tire for uneven terrain according to claim 2, wherein said blocks include a recessed block having a recess portion in the center portion of said block tread surface.

5. The motorcycle tire for uneven terrain according to claim 1, wherein said blocks include a recessed block having a recess portion in the center portion of said block tread surface.

6. The motorcycle tire for uneven terrain according to claim 1, wherein in said outer block, said inclination angle $\alpha2$ of the circumferentially extending block wall surface is larger than the inclination angle $\alpha2$ of the circumferentially extending block wall surface of the center block.

7. The motorcycle tire for uneven terrain according to claim 6, wherein said blocks include a recessed block having a recess portion in the center portion of said block tread surface.

* * * * *